US011212332B2

(12) United States Patent
Nielsen et al.

(10) Patent No.: US 11,212,332 B2
(45) Date of Patent: *Dec. 28, 2021

(54) DYNAMIC ARCHIVING OF STREAMING CONTENT

(71) Applicant: Amazon Technologies, Inc., Reno, NV (US)

(72) Inventors: Olaf Nielsen, Portland, OR (US); John Richardson, Lake Oswego, OR (US); Darin J. Klaas, Beavorton, OR (US); Benjamin Ferrentino, Portland, OR (US); Evan Gerald Statton, Denver, CO (US); Fritz Koenig, Portland, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/194,494

(22) Filed: Nov. 19, 2018

(65) Prior Publication Data

US 2019/0098066 A1   Mar. 28, 2019

Related U.S. Application Data

(63) Continuation of application No. 15/381,963, filed on Dec. 16, 2016, now Pat. No. 10,135,899.

(51) Int. Cl.
*H04L 29/06* (2006.01)
*H04L 29/08* (2006.01)
(Continued)

(52) U.S. Cl.
CPC ........ *H04L 65/607* (2013.01); *H04L 65/4076* (2013.01); *H04L 65/605* (2013.01);
(Continued)

(58) Field of Classification Search
USPC ......................................... 709/219, 226, 229
See application file for complete search history.

(56) References Cited

U.S. PATENT DOCUMENTS 5,862,342 A * 1/1999 Winter ............. G08B 13/19604
709/231
6,246,803 B1 * 6/2001 Gauch ................... H04N 17/00
348/E17.001

(Continued)

OTHER PUBLICATIONS

Notice of Allowance dated Jul. 31, 2018 in U.S. Appl. No. 15/381,962.

*Primary Examiner* — Jude Jean Gilles
(74) *Attorney, Agent, or Firm* — Hogan Lovells US LLP

(57) ABSTRACT

Content-specific archive files can be generated concurrently with the encoding of an output stream, such as for broadcast content. Tags or triggers, such as SCTE-35 messages, can be detected in the input content stream, and those triggers used to determine actions to be taken with respect to the content stream. As an example, program start tags and end tags can be used to determine when to begin, and end, the archiving of content to an output file specific to that program content. For archives that should not include advertising, secondary content, or any non-program content, triggers such as advertising start and stop tags can be used to determine when to pause and resume recording for those archives. Once completed, these archive files can be made accessible to users, such as through a video-on-demand service or other such offering.

20 Claims, 7 Drawing Sheets

(51) Int. Cl.
*G06F 11/36* (2006.01)
*G06F 9/44* (2018.01)

(52) U.S. Cl.
CPC .............. *H04L 67/02* (2013.01); *H04L 67/06* (2013.01); *H04L 67/20* (2013.01)

(56) References Cited

U.S. PATENT DOCUMENTS

| | | | | |
|---|---|---|---|---|
| 7,512,975 | B2* | 3/2009 | Aissi | G06F 21/64 709/226 |
| 8,953,044 | B2* | 2/2015 | Wu | H04N 19/59 348/149 |
| 9,037,287 | B1 | 5/2015 | Grauerger | |
| 9,148,414 | B1* | 9/2015 | Roth | H04L 63/08 |
| 10,135,899 | B1* | 11/2018 | Nielsen | H04L 65/605 |
| 2005/0149733 | A1* | 7/2005 | Catherman | G06F 21/57 713/175 |
| 2005/0156622 | A1* | 7/2005 | Roziere | G01R 31/31922 326/16 |
| 2007/0067362 | A1 | 3/2007 | McArdle | |
| 2008/0072159 | A1* | 3/2008 | Cockerton | H04L 65/1083 715/756 |
| 2010/0017373 | A1 | 1/2010 | Harada | |
| 2011/0158326 | A1 | 6/2011 | Kordon | |
| 2011/0258163 | A1 | 10/2011 | Volkoff | |
| 2012/0144014 | A1* | 6/2012 | Natham | H04L 67/1002 709/224 |
| 2013/0205380 | A1* | 8/2013 | Avni | H04L 63/0853 726/7 |
| 2015/0072726 | A1* | 3/2015 | Stern | G06F 21/575 455/552.1 |
| 2015/0074745 | A1* | 3/2015 | Stern | G06F 21/57 726/1 |
| 2015/0074764 | A1* | 3/2015 | Stern | H04L 63/06 726/4 |
| 2015/0082039 | A1* | 3/2015 | Stalzer | H04L 67/14 713/171 |
| 2016/0314120 | A1* | 10/2016 | Dauderman | G06F 16/437 |
| 2017/0012906 | A1 | 1/2017 | Szilagyi | |
| 2017/0272419 | A1* | 9/2017 | Kumar | H04L 63/06 |
| 2018/0157825 | A1 | 6/2018 | Eksten | |

* cited by examiner

DYNAMIC ARCHIVING OF STREAMING CONTENT

CROSS-REFERENCE TO RELATED APPLICATION

This application is a continuation of U.S. patent application Ser. No. 15/381,963 filed Dec. 16, 2016, which is hereby incorporated herein by reference.

BACKGROUND

Users are increasingly obtaining content in digital format, often downloading or streaming that content from a remote service. In some instances content will be available in multiple forms, where the form may depend upon the time at which the content is accessed. For example, content for a live broadcast might be streamed while the broadcast is occurring, but might be available for download or subsequent access from a stored file after the broadcast. Depending upon the timing, there might also be different versions available, such as versions that correspond to the broadcast (including advertising and other content) and versions that contain only program content. In order to provide these different versions, effort is required (often manual effort) to generate and maintain the different versions. Because the timing of the program content can vary from the scheduled time, this can also require storing and analyzing more content than is required for the files. The need to create these versions also delays their availability, which can negatively impact accessibility and viewership.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the providing of media content. In particular, various embodiments provide for the automatic generation of content-specific archive or output files concurrently with the generation of an encoded output stream, such as for broadcast content. Tags or triggers such as SCTE-35 or SCTE-104 messages can be detected in the content stream, and those triggers used to determine actions to be taken with respect to the content. For example, program start tags and end tags can be used to determine when to begin and end the archiving of content to an output file specific to that program content. For archives that should not include advertising, secondary content, or any non-program content, triggers such as advertising start and stop tags can be used to determine when to pause and resume recording for those archives. Once completed, these archive files can be made accessible to users, such as through a video-on-demand service or other such offering.

Various other such functions can be used as well within the scope of the various embodiments as would be apparent to one of ordinary skill in the art in light of the teachings and suggestions contained herein.

Figure 1:
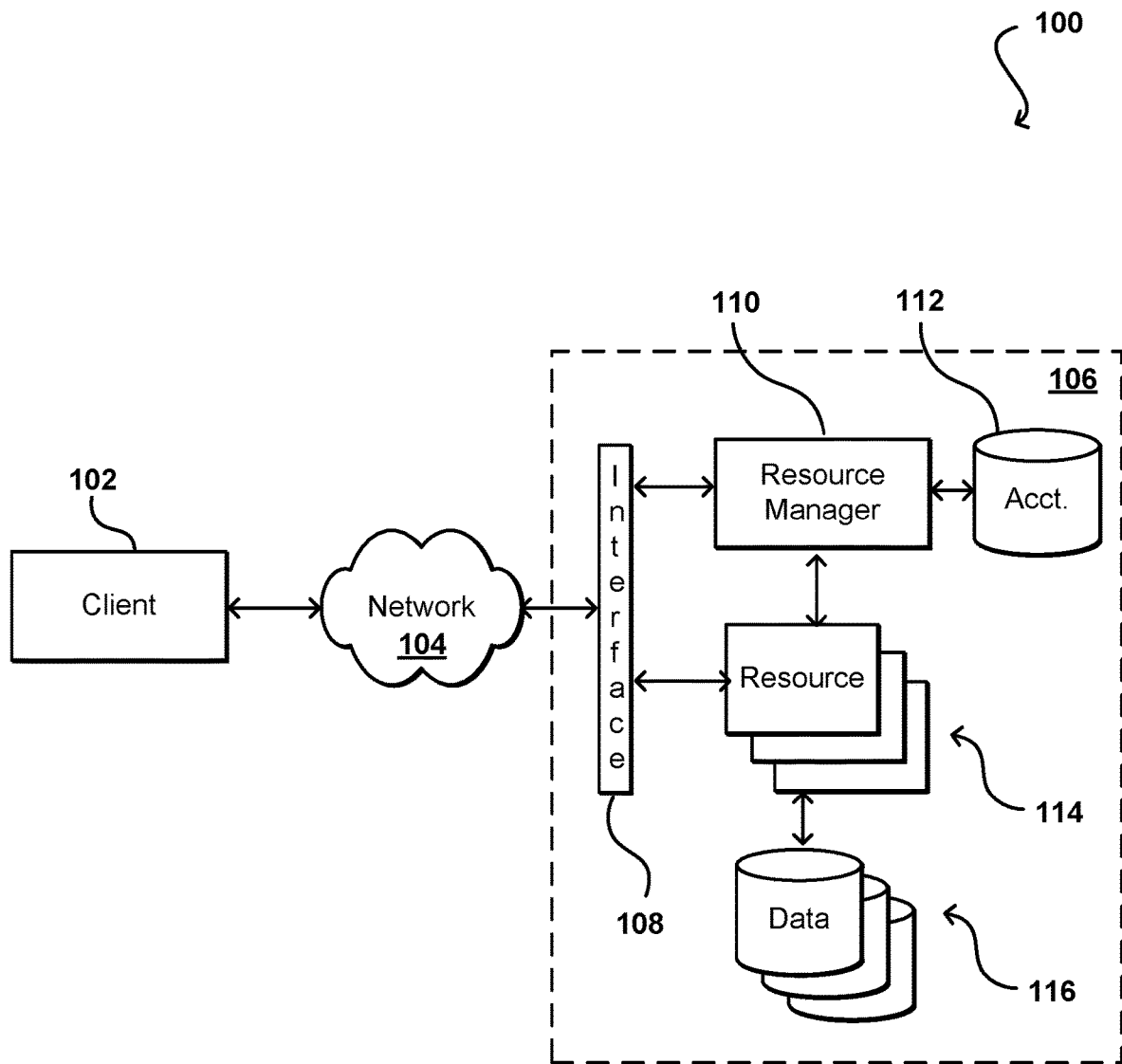
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
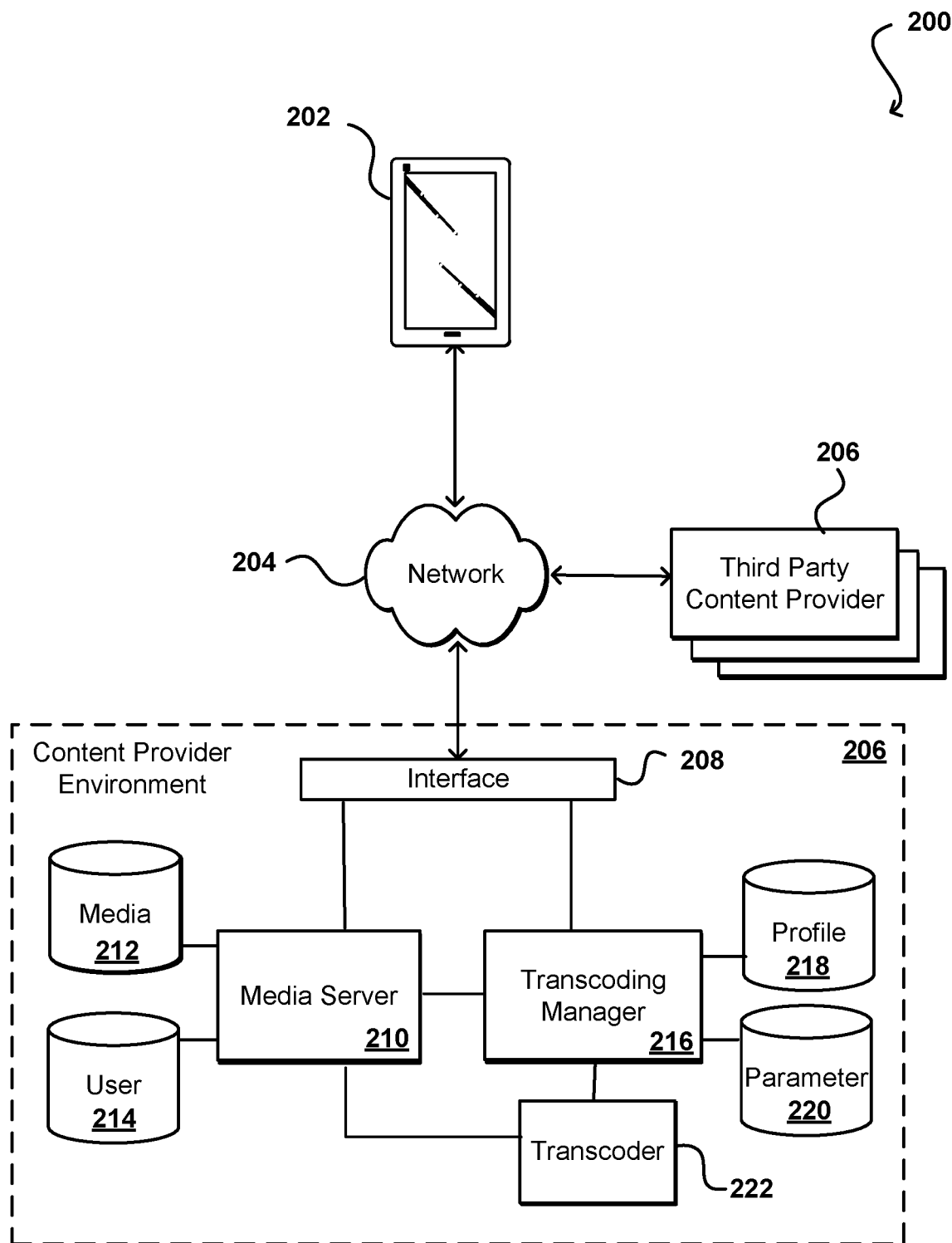
FIG. 2 illustrates an example subsystem for managing media encoding that can be utilized in accordance with various embodiments.

FIG. 2 illustrates an example system 200 that can be used to implement aspects of the various embodiments, in an electronic environment such as that discussed with respect to FIG. 1. In the system of FIG. 2, a client computing device 202 can submit a request for content across at least one network 204 to be received by a content provider environment 208. As mentioned, in at least some embodiments the request can include a request for content to be displayed on the computing device 202, and in many cases will include video or other media content that is encoded for presentation on the client device 202. The network(s) can include any appropriate network, such as the Internet, a local area network (LAN), a cellular network, an Ethernet, or other such wired and/or wireless network. The content provider environment 208 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, or other such system or device. An interface layer 208, when receiving a request or call, can determine the type of call or request and cause information to be forwarded to the appropriate component or sub-system. For example, a request for content might be forwarded to a media server 212 while a request to specify encoding parameters might be forwarded to a encoding manager 216, among other such options. These calls or requests can also come from third parties, although third party providers 506 can also provide at least some of the media content to be stored to a media repository 212 and encoded for display on the client device 202 as discussed herein.

In this example, a call received to the content provider environment 208 can be received by an interface layer 210 of the environment. As known for network environments, the interface layer can include components such as interfaces (e.g., APIs), load balancers, request and/or data routers, and the like. If the request is a request for content, such as for a video data stream to be provided to the client device 202, information for the request can be directed to one or more media servers 210, which can obtain the content from a media data store 212 or other such repository to be sent back across the network(s) to the computing device. In some embodiments, information for the request might also be compared against user data in a user data store 214 or other such location to determine, for example, whether the user has access rights to that content, and potentially the formats or versions to which the user has access rights.

In at least some embodiments a request from an operator, an administrator, a client device 202, a third party provider 224, or another such source might include a request to specify one or more sets of encoding parameters to be used with a media file. Accordingly, information regarding the encoding parameters can be provided to a encoding manager 216, or other such component or service, that is able to receive the information through an appropriate interface (i.e., an API or console) and cause the profile and parameter data to be stored to appropriate repositories 218, 220 as discussed elsewhere herein. When a request for a video file is received, the encoding manager 216 can use the profile and parameter data to determine the appropriate encoding information, and can pass that to one or more encoders 222, which can obtain the media file and encode the media file per the encoding information, which can then be provided to the client device by a media server 210 or other such component.

As mentioned, such a system can be used to provide an output stream of content for live broadcasts, or the download or other transmission of stored or archived content, among other such options. For various types or sources of content, at least some of these versions require generation and in some instances manual intervention. For example, a broadcaster might stream content continually, over at least a period of time, and might make that broadcast stream available for consumption by various users. In order to enable users of various types of devices to consume this broadcast, a content delivery service might provide different encodings of the content. In addition to the encoded output stream, a content provider or content delivery service might want to also make at least some of that content available for subsequent consumption, such as through an on-demand delivery service. The on-demand delivery service can enable a client device to obtain archived program content that is stored to one or more relevant files.

It might be the case that certain versions of the content should be available at different times. For example, a broadcaster interested in ratings, such as the Nielsen ratings, might have to provide the content as broadcast and within a specific time period of the original broadcast for a specific consumption to count towards the ratings for the program, which is used to determine values such as viewership and advertising revenue. Thus, it can be desirable to not only provide the live stream, but also to provide an on-demand version after the broadcast that is available as quickly as possible, to maximize potential viewership, and has the necessary aspects to qualify towards the ratings. This can include, for example, including any advertising or other content as was included with the original broadcast, and potentially with fast forward or other playback manipulation disabled. Similarly, once the content is outside the period where it will count towards viewership for that broadcast period, the provider might want to provide the content on demand but without the advertising or other content (or with other advertising) in order to improve the user experience. Unfortunately, current approaches for generating these various versions require manual intervention, which consumes resources and causes these versions to not be available as quickly as desired.

Accordingly, approaches in accordance with various embodiments can automatically generate multiple versions of received content in order to provide both an output stream in near real time, as well as archived versions that can be available as soon as the broadcast has completed (or sooner in some embodiments). These archived versions can be available on-demand or using other appropriate transmission approaches. The input content stream can be encoded into an appropriate output stream using a conventional encoding process or other such mechanism as discussed and suggested herein. As part of the processing of the content stream, the stream can be analyzed or monitored to attempt to detect the presence of one or more types of markers, such as SCTE-104 or SCTE-35 markers, located within the content stream. SCTE-104 markers (per the standards set forth by the Society of Cable Telecommunications Engineers) can indicate specific locations in the content stream, such as may represent locations for the injection of supplemental content, such as advertising. SCTE-35 messages, also referred to as SCTE-35 triggers, are often received in input from sources such as regional broadcasting systems. These triggers are used within a media video stream to indicate information such as program start stop times and opportunities for advertising placements, especially in North America. While SCTE-35 markers will be used as a primary example herein, it should be understood that other types of markers or triggers, such as SCTE-104 markers and markers for other standards) can be used as well within the scope of the various embodiments.

SCTE-35 triggers are hierarchical, and thus can be expected to occur in a determined pattern with respect to one another in the content stream. A program, or other instance of content, will generally have a program start trigger positioned proximate a beginning location of the program data in the stream, and a program end trigger positioned proximate and ending location of the program data, although other such triggers can be utilized as well as discussed and suggested herein. Between those triggers, as part of the program broadcast stream, can be pairs of triggers that indicate various breaks, such as the beginning and end of opportunities for advertising or other supplemental content. Other triggers can be included as well, as may refer to chapter or segment breaks, and the like. These triggers can be detected during an encoding and/or transcoding process, and can be used to determine the generation of one or more separate outputs for the determined input stream. In addition to an output stream, the triggers can be used to generate an archive file for a block of programming or a single program, where the archive includes any advertising or other content provided with the original output broadcast stream. The triggers can also be used to dynamically generate an archive file that includes only programming content, without storing or including any of the advertising or other supplemental content. In this way, the archive files can be generated automatically and can correspond to the desired content. Further, the archive files can be created concurrently with the broadcast such that the files can be available for access shortly after the actual broadcast completes. For some embodiments where the entire content does not have to be captured, some embodiments can also enable the accessing of on-demand content from the beginning of the content while a remainder of the content is still being broadcast and/or archived, among other such options. Such approaches can be useful for any received input streams, but in at least some embodiments particularly beneficial for live or real time event content, such as may relate to sporting events, prime time viewing, concerts, and the like. In addition to triggering new functions, such as file storage start or stop, special behaviors can be defined to cover file naming (event name, program name, start time, SCTE trigger type) and special case handling of non-optimal sequences of SCTE-35 messages that have been inserted into the source upstream, among other such options.

Figure 3:
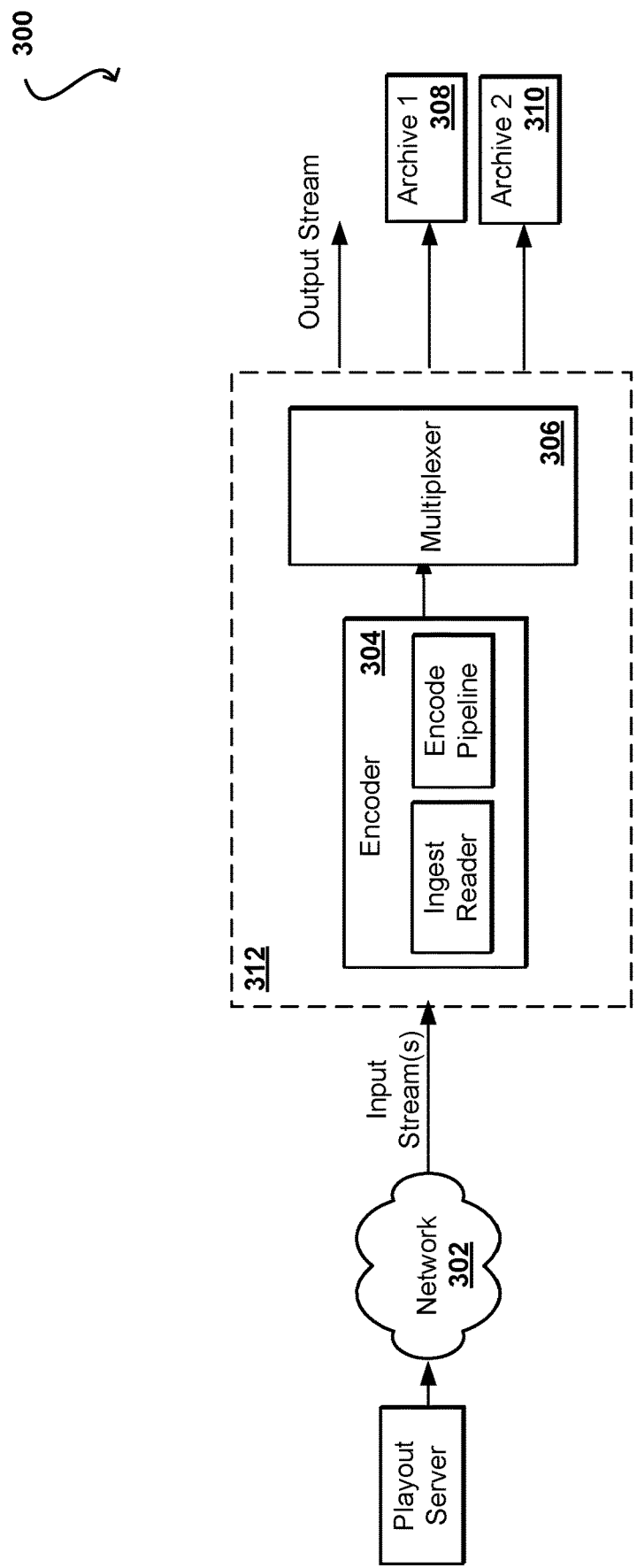
FIG. 3 illustrates an example encoding subsystem that can be utilized in accordance with various embodiments.

FIG. 3 illustrates an example encoding subsystem 300 in which such functionality can be implemented in accordance with various embodiments. In some embodiments an encoding subsystem includes one or more encoders 304, a set of bitstreams (or video signals), and a content delivery network. The encoders can include both encoders and packagers, which can be implemented via an origin server in some embodiments. A packager can receive a signal (e.g., feed), such as a video signal, a media input file, a content broadcast, or a live input stream over at least one network 302. The content can be received from a system or component such as a playout server of a broadcaster, which is configured to combine segments in the correct sequence at the correct time for the broadcast, and can be configured to insert SCTE-35 messages or other tags or triggers in the output as appropriate. In this example the stream is received to an encoder 304 that has a respective multiplexer 306 for generating output file, which in this case includes an encoded output stream as well as two archive files 308, 310 for a specified instance of broadcast content. The encoder and multiplexer could be separate components or part of a single system 312, service, application, or component in various embodiments. A live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. A packager (not shown) may receive one or more input signals (e.g., input) and generate one or more bitstreams. The bitstreams can be delivered by an encoder/packager to a content delivery network (CDN) or other such means of conveyance. The bitstreams can represent various encoded/packaged versions of the signal feed, as may be encoded per the encoding parameters from the encoding manager. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams may comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The origin server may be configured to perform a content invalidation. For example, one or more of the content segments may be invalidated. Content invalidation may prevent and/or stop content from being delivered to the client devices. To initiate an invalidation of content the operator may send the invalidation signal input (e.g., the operator initiated content invalidation) to the origin server. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN. For example, the client device may request the manifest file and when the TTL value expires for the cached manifest in the various nodes of the CDN, the updated manifest file (e.g., the invalidated manifest) may be distributed throughout the CDN to the client device.

A change in video stream may be initiated by a user in one example. In another example, a quality of service test may be implemented. For example, if the video stream represented using the content segments was of such a poor quality that an advertiser and/or a broadcaster would not be satisfied, the content segments may be rearranged (e.g., by providing the alternate content) and/or removed quickly. For example, if the content segments represent an advertisement of poor quality (e.g., fails the quality of service test), an alternate advertisement could be displayed by invalidating the content segments. The content segments may be invalidated automatically if the content segments do not pass the quality of service test.

An example manifest file can include various data, such as a file header, metadata, and/or pointers/links. The data can be human-readable or coded using an encoded format, an encrypted format and/or computer readable (e.g., binary) format. The format of the data in the manifest file may be varied according to the design criteria of a particular implementation. The file header can provide an indicator to identify the manifest file as a particular type of file. For example, the file header may be used by the origin server, cache nodes, and/or any other computing device to recognize the manifest file as a particular type of file (e.g., a pointer file, a manifest file, etc.). The metadata may indicate the type of file to be served when following specified links. For example, the metadata may indicate that the links represent a video stream, a bandwidth needed to playback the content segments, the codecs implemented for the content segments, the resolution (e.g., in pixels) of the content segments, and/or any other relevant data. The type of data available in the metadata may be varied according to the design criteria of a particular implementation. The pointers may point to various types of stored data. The stored data may be the content segments. For example, a pointer can be an HTTP URL link. In some embodiments, the pointers may be implemented as a RTMP link and/or an FTP link. The format of the pointers may be varied according to the design criteria of a particular implementation. The pointers of the manifest file can point to the respective content segments. The content segments in some embodiments can be implemented as Transport Stream (e.g., .ts) files. For example, the content segments may comprise MPEG-2 data. In some embodiments, the manifest file may be embedded within the bitstreams. The type of invalidation and/or recovery may be varied according to the design criteria of a particular implementation. The type of invalidation may be based on the invalidation information (e.g., instructions) provided in the invalidation signal input. For example, the signal input may be a content invalidation signal initiated by the operator.

Various media encoders or transcoders can monitor a set of inputs, such as SDI inputs, for information such as video format, audio format (i.e., pulse code modulation (PCM) audio format, Dolby Digital audio, Dolby Digital Plus, DolbyE, etc.), audio levels, resolution, frame rate, and timecodes, while being able to concurrently use those inputs to provide media to one or more transcoding pipelines. Other input types, such as asynchronous serial interfaces (ASIs) or high-definition multimedia inputs (HDMIs), can be monitored using such processes as well.

In this example, a component of the encoding service, such as an ingest reader, can analyze the input stream to detect SCTE-35 triggers in the content stream. For a continual input broadcast stream, the encoder 304 can work with the multiplexer 306 to generate an output media stream that can be consumed by any authorized and/or capable device receiving the stream. Upon detecting a specified SCTE-35 trigger, such as a start program trigger, the service can also initiate the storing or archiving of at least one program archive file 308, 310 for the program content. The storing of the archive files 308, 310 can continue until a stop program trigger or other such message is detected in the content stream. As mentioned elsewhere herein, the storing can be paused for at least one of the archive files whenever certain triggers are detected in the stream. For example, an archive file that is to include only program content might have storage of the encoded data paused during a commercial break or occurrence of supplemental content.

Figure 4:
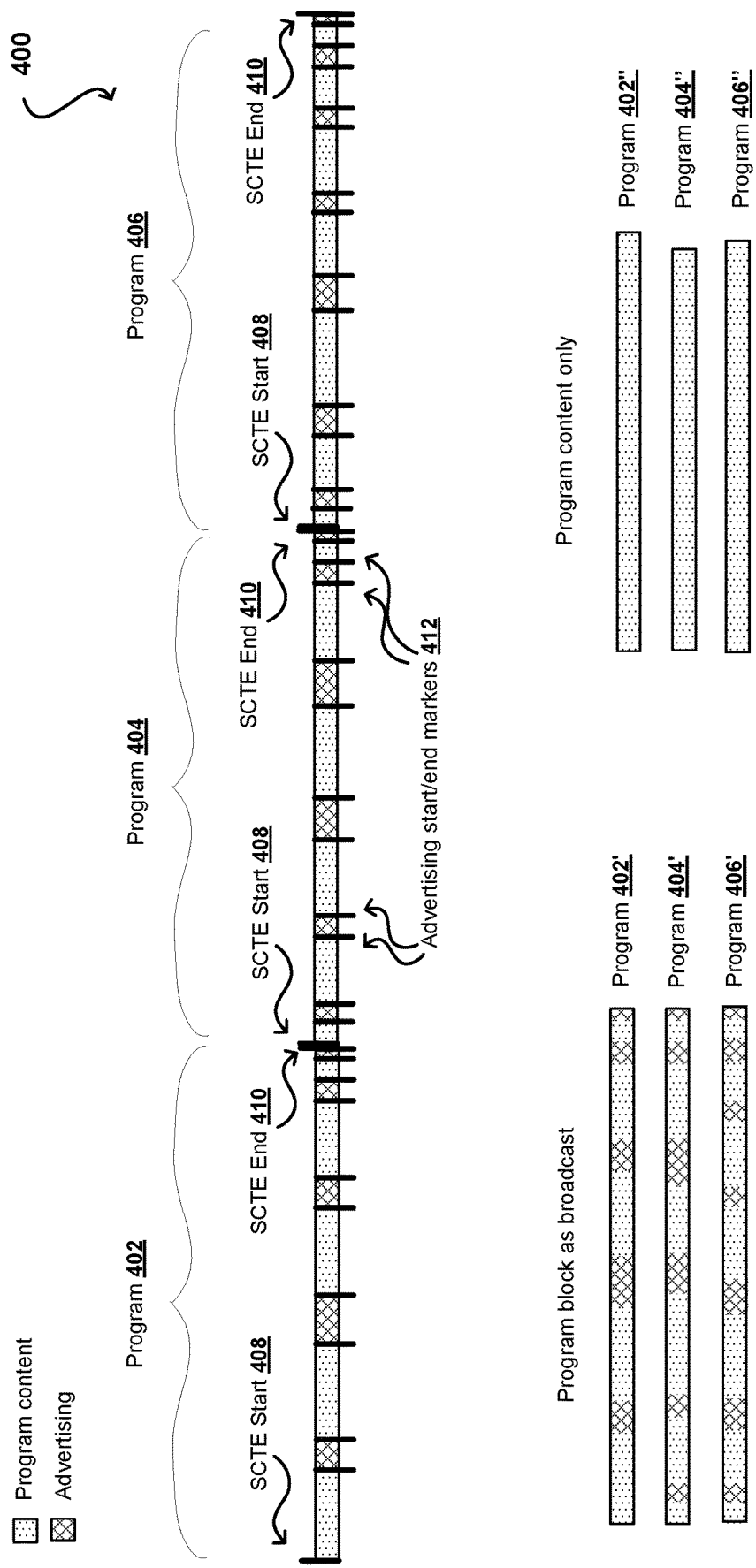
FIG. 4 illustrates an example approach to archiving portions of streaming content that can be utilized in accordance with various embodiments.

FIG. 4 illustrates an example content stream 400 that can be received in accordance with various embodiments. In this example, a block of programming is to be provided as an output stream, as well as to have various archive files generated. The programming in question includes three programs 402, 404, 406 each with multiple segments that will be separated by commercial breaks. As illustrated, there is a program start maker 408 and a program end marker 410 associated with each program. There are also advertising start and advertising end markers 412 designated the location of each commercial break in the broadcast. The broadcaster can provide a schedule of anticipated programming that can be used to determine aspects such as the programming that will be received, the types of archiving to be performed for various time periods, and the like. For example, the content service might determine to generate an archive file for the entire programming block, including all three programs, that will begin archiving when the program start trigger 408 is received for the first program 402 and end when the end program trigger 410 is received for the last program 406. The service might also determine that an archive file 402', 404', 406' should be generated for each individual program 402, 404, 406, starting when the respective program start trigger is detected and ending when the respective program end trigger is received. A similar archive 402", 404", 406" might be generated for each individual program as well, but that is to include only program content. Accordingly, the archiving might start and end with the respective triggers but pause during commercial breaks, where storing would stop upon detecting and advertising start trigger and resume upon detecting an advertising end trigger, among other such options. The same or similar concurrent encodings can be used such that the archive files can be generated concurrently with the generation of the encoded output stream. In this way, the archive files will be completed and available at approximately the same time as the broadcast ends.

Figure 5:
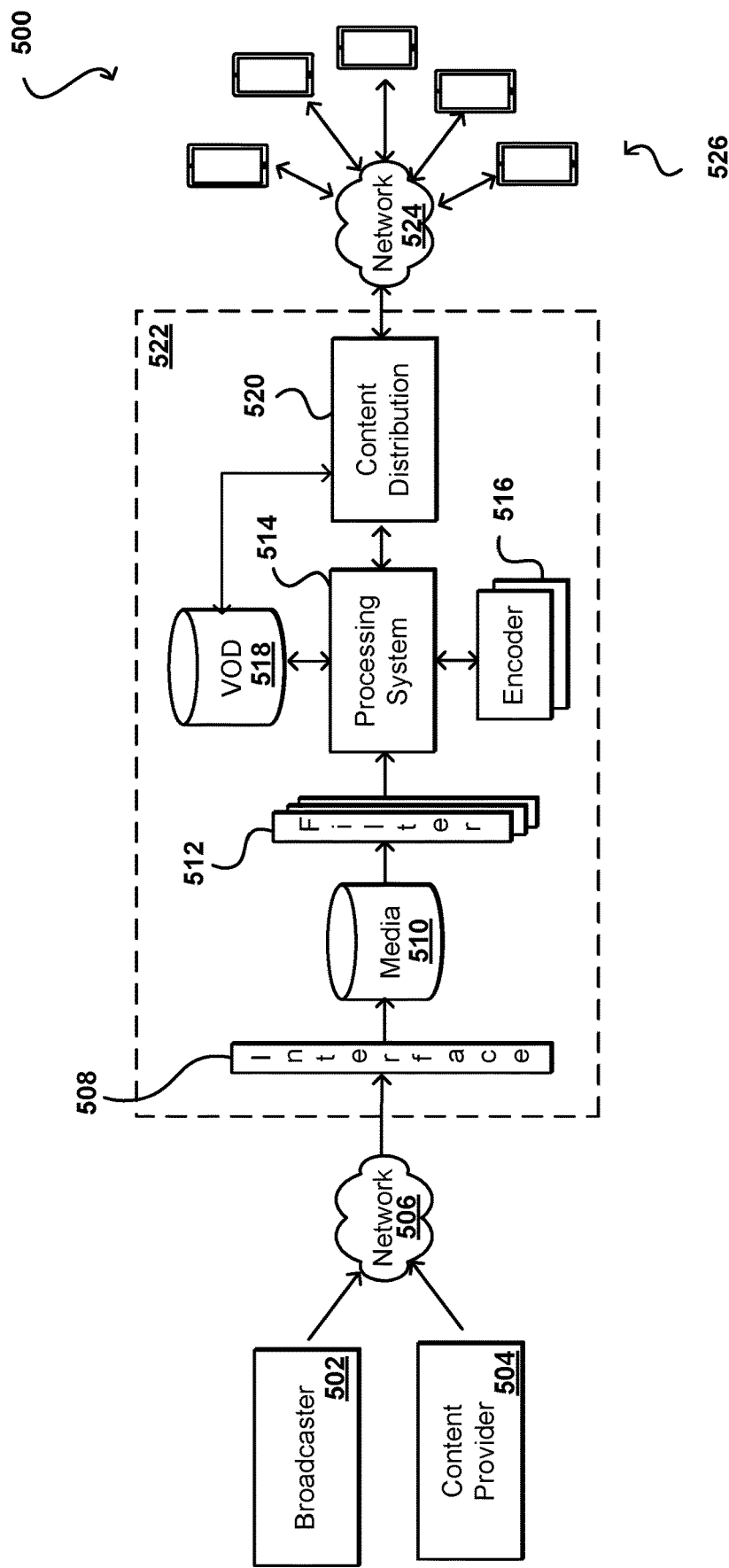
FIG. 5 illustrates an example system that can be used to provide event content in accordance with various embodiments.

There are various triggers that can be used to determine when to store data for a particular archive. As mentioned, many file captures will be initiated with SCTE-35 triggers that indicate a program start, and terminate with triggers that indicate a program end. Triggers indicating the start and end of advertising breaks can indicate when to pause archiving or storage for files that are to include only the programming content. There are various other triggers that can be used to start, stop, pause, resume, or otherwise modify the archiving of broadcast data. These can include, for example, SCTE-35 triggers such as:

Program Start
Program End
Program Early Termination
Program Breakaway
Program Resumption
Program Start—In Progress
Chapter Start
Chapter End
Provider Advertisement Start
Provider Advertisement End
Distributor Advertisement Start
Distributor Advertisement End
Provider Placement Opportunity Start
Provider Placement Opportunity End
Distributor Placement Opportunity Start
Distributor Placement Opportunity End FIG. 5 illustrates an example system 500 that can be used to implement aspects of the various embodiments. In this example, various sources of input content, such as a broadcaster 502 or other content provider 504, can upload, stream, or otherwise transfer media content over one or more networks 506 to be received to an interface layer 508 of a content provider environment 522, which as discussed with respect to some embodiments herein can provide output content as part of a content delivery service or other such offering. The content provider can be a shared resource environment, as discussed with respect to FIG. 1, or a dedicated network used by the content provider to provide the relevant content for consumption on various types of device 526 associated with various users of the service. As mentioned, the client devices 526 can be running an application or otherwise interacting with an interface that enables content to be received and provided for playback on the respective devices. The input data, such as a broadcast data stream, can be received to an interface layer 508 and then directed to an appropriate media repository 510, which can be used to buffer or cache the input content until such time as the content is able to be processed. While in some embodiments it will be desirable to process the content in as near real time as possible, in at least some system there will be some memory or data store provided to receive or buffer the content for processing. In some embodiments there can be a dedicated upload interface or address for each input stream, as well as a dedicated buffer for each stream, while in other embodiments content for various input streams can be tagged with identifying data and stored to a large media repository, among other such options. For live streaming input the media repository 510 may act as a cache or buffer, while for other options the repository might store the data until sufficient data has been received or an aggregation process in executed, etc.

In this example a processing system 514 can be tasked with analyzing, modifying, or otherwise generating media content that can be output for display or other presentation on one or more client devices 526. The processing system can include various processing components such as host machines, virtual machines, and the like. The processing system 514, which can also be offered as a service from inside or external to the content provider environment, can obtain the media content from the media repository 510 and in some embodiments can cause one or more filters 512 to be applied to the content. As mentioned, the filters can attempt to remove any content that does not satisfy specific criteria, rules, or policies, or modify any levels of brightness, volume, noise, or other aspects that might fall outside the allowable ranges. Other filters might be used as well that attempt to modify the input content based upon factors such as sharpness, blurriness, brightness, contrast, view, motion blur, volume, background noise, and dynamic range. Various other filters can be applied as well as discussed and suggested elsewhere herein. In some instances the content adjustments might be made automatically, such as to provide the content in an appropriate format or resize to a specified size, while other adjustments might need to be made manually, such as to provide with a certain aspect ratio or brightness level, etc.

The processing system 514 can receive or obtain the video content after any filtering and determine the type(s) of output to be generated. This can include, for example, analyzing a schedule of upcoming programming and determining, based upon various rules or policies for the provider or type of content, the types of output to be generated. For example, a content provider might specify an output policy indicating that all programming over a period of time should be stored to a single archive file, in addition to a live output stream being generated. Other potential output policies can specify, for example, capturing as-broadcast archives for each individual program, including any commercials or secondary content as broadcast, and/or program content-only archives that do not include advertising or secondary content, among other such options. The policies may specify specific types of output for specific types or sources of content, among other such options. The processing system 514 can work with various encoders 516, transcoders, aggregating servers, audio processing algorithms, or other such components, systems, or services, in order to generate the appropriate outputs in the appropriate formats and with the specified encodings. For program-only content, some amount of stitching can be performed using the segments in the order broadcast in order to generate a single file output that will play seamlessly on any of the client devices 526. In at least some embodiments, metadata for the individual streams, archives, or other outputs can be written to the output in order to enable the specific versions to be subsequently selected or identified. The produced output can be streamed to the various devices 526 and/or stored to a video on demand repository 518, or other such location from which the archived output can be subsequently obtained. In at least some embodiments one or more of the repositories, or a different repository, can be used to buffer at least some of the content for live streaming, among other such options. When the content is to be provided for presentation via one or more of the client devices 526 or other presentation options, a content distribution system 520, service, or network (CDN) can obtain the appropriate data from the output stream or repository 518 and cause that content to be provided to the respective destination devices 526 over at least one appropriate network 524, which can include at least some of the same networks 506, or types of networks, over which the input content was received. As mentioned, the device can have the ability to change a feed, stream, or file being received, such as by sending a request to the content distribution system 526 for a new stream, feed, or file, and can also modify playback by providing pause, rewind, or other such instructions. There may also be different versions of the stream, such as may have different sizes, qualities, or formats, from which a viewer can choose. In some embodiments a client device 526 can be able to rate or provide feedback on the media content. A user can also be notified if a new version or stream of the content becomes available, or in some instances can always receive the most recent or appropriate version for the client device.

Figure 6:
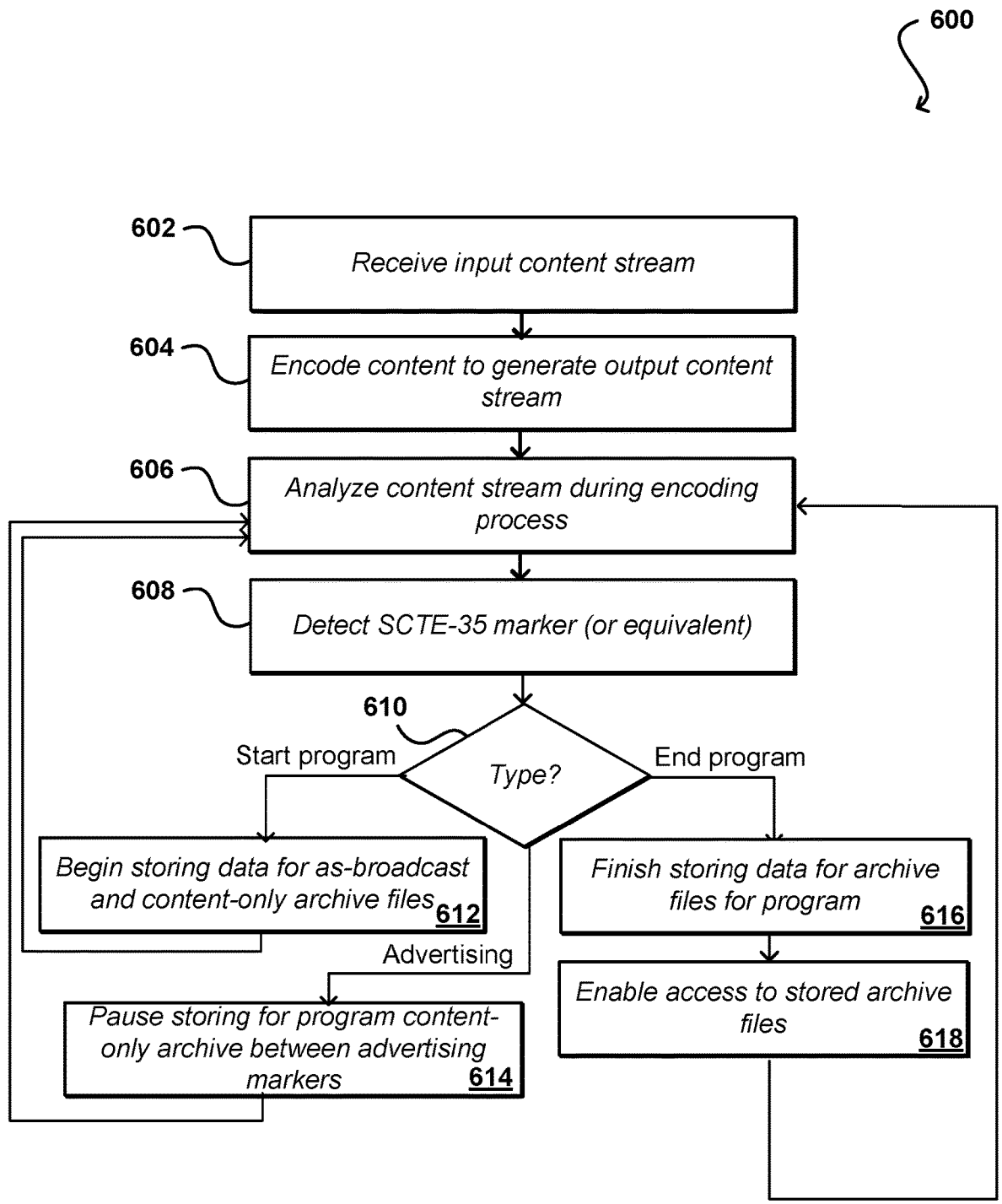
FIG. 6 illustrates an example process for generating archive files for streaming content that can be utilized in accordance with various embodiments.

FIG. 6 illustrates an example process 600 for generating multiple outputs for an input content stream that can be utilized in accordance with various embodiments. It should be understood that for any process herein there can be additional, fewer, or alternative steps performed in similar or alternative orders, or in parallel, within the scope of the various embodiments unless otherwise specifically stated. In this example, an input content stream is received 602, such as may correspond to a broadcast of a sequence of content received from a broadcaster. The content from the input stream can be encoded 604, formatted, and/or otherwise processed to generate an appropriate output stream, such that viewers are able to consume (i.e., obtain, play, present, display, etc.) the broadcast content on various types of computing or presentation devices. As mentioned, there can be various rules or policies that indicate whether additional outputs should be generated for an input stream, as well as the number and/or types of outputs to be generated. For an input stream where at least one archive file (or output other than the live output stream) is to be generated, the content stream (or content of the stream) can be analyzed 606 to attempt to locate various triggers, messages, tags, or other metadata contained within, or associated with, the input stream.

During receipt and/or processing of the input stream, a SCTE-35 marker (or equivalent metadata, message, etc.) can be detected 608 for which an action is to be taken. As mentioned, there can be various SCTE markers included in the stream, and a subset of those markers can have associated actions to be taken for an input stream as may be determined by the relevant policy, rule, or configuration, etc. A determination can be made 610 as to the type of marker detected in the stream. For a start program or similar trigger, the storing of data can begin 612 for archive files relating to that content, such as an as-broadcast archive including program and advertising content and a program only archive that does not include advertising or other content, among other such options. In some embodiments this can start a block of recording that will include content from multiple programs in a single file, among other such options. A set of configuration templates can be provided to the encoder(s) with the appropriate configuration parameters for each type of archive to be generated. The template can specify information such as, for example, encoding format, sampling structure or frequency, quantization level correspondence, code word usage, samples, per line, and so on. If an end program (or similar) trigger is detected, then the storing of data for a respective file can be finished 616 or otherwise finalized to generate an output archive file. Access to the stored archive file can then be enabled 618 almost instantly, once the file is available to, for example, a content delivery network and indexed or otherwise made available to users or device through the CDN.

In between detection of the start and stop triggers, while the program content is being stored to an archive file that is not to include advertising or other secondary content, a trigger can be detected that indicates the start of an advertising break or opportunity, among other such options. Accordingly, the storing of input or content data can be paused 614 for that respective archive file (or files). When an advertising end trigger or other such trigger is received that indicates a resumption of program content, as may also relate to a chapter start or other such trigger, the storing of content can resume such that the archive file will not miss any of the program content. In at least some embodiments the storage to the archive file may err on the side of being over-inclusive, such that program content will not be missed for program-only archives but some advertising might be inadvertently included. This might include, for example, receiving a chapter start trigger before receiving and advertising end trigger. In such cases the content may be recorded or stored to the archive but a notification generated that the archive should be checked to determine whether advertising or other secondary content was included in the archive. In some embodiments information or a link to the questionable period can be provided for quick review, and the archive may not be made available for access in some embodiments until the content has been reviewed and approved, among other such options. Similarly, in situations where content identification is included in the markers or stream, if the marker deviates from an expected marker or indicates that it is for unexpected content, then a notification can be generated but the content still recorded in at least some embodiments. Where information about the content is provided, this information can be used to generate the filename for the archive or index the content for searching, among other such options.

Figure 7:
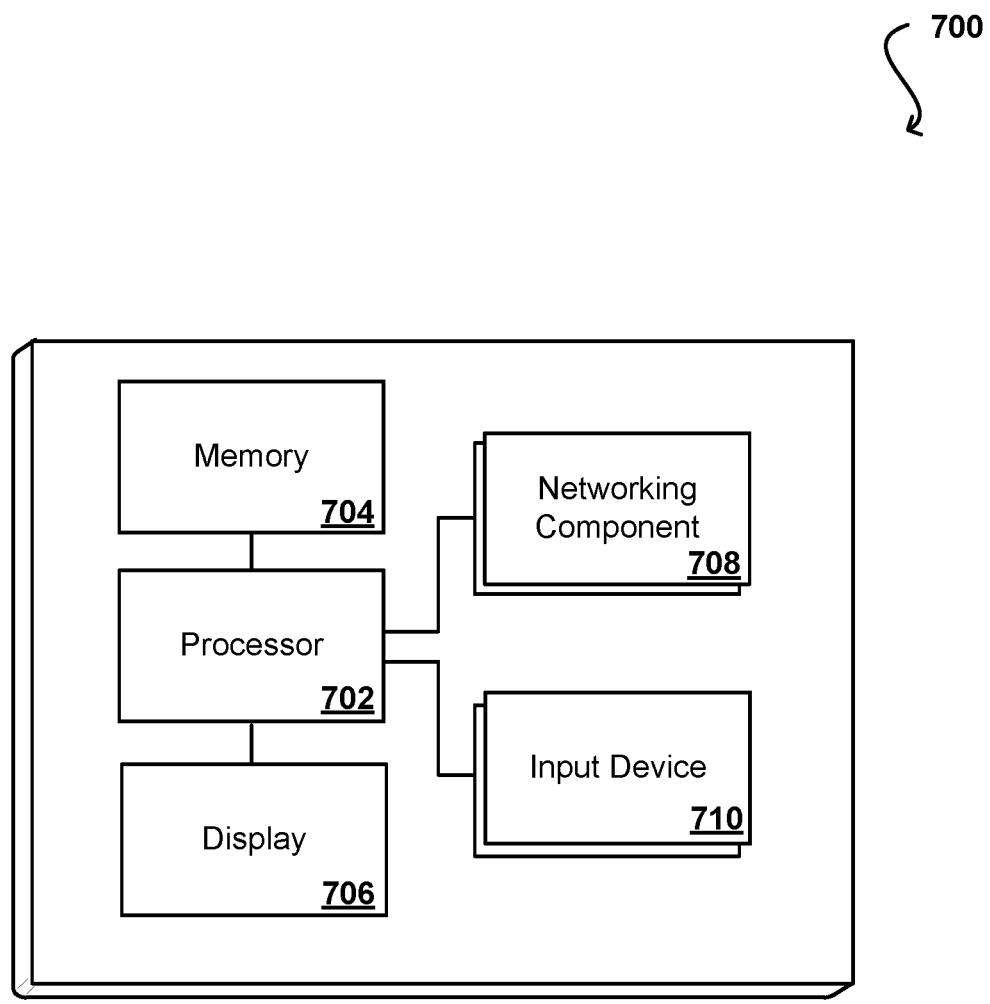
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A computer-implemented method, comprising:
receiving an input stream of content;
encoding an output stream from the input stream;
detecting a first trigger in the input stream;
storing content from the input stream, concurrent with the encoding, based at least in part on a policy associated with the first trigger, to an archive file;
detecting a second trigger in the input stream; and
terminating storage, based at least in part on a policy associated with the second trigger.

2. The computer-implemented method of claim 1, further comprising:
determining a type of archive file, based at least in part on the policy associated with the first trigger.

3. The computer-implemented method of claim 2, wherein the archive file includes program content and any additional content in the input stream received over a period of time between detection of the first trigger and the second trigger.

4. The computer-implemented method of claim 1, further comprising:
determining, per at least one policy, that the archive file is to include only program content;
detecting, during storage of the content, a first content trigger indicating content other than the program content;
pausing storage of the content to the archive file;
detecting a second content trigger indicating resumption of the program content in the input stream; and
resuming the storage of the content to the archive file.

5. The computer-implemented method of claim 1, further comprising:
enabling the archive file to be available for presentation via one or more client devices.

6. The computer-implemented method of claim 1, further comprising:
determining a schedule of a sequence of program content to be received over a period of time; and
causing the sequence of program content received over the period of time to be stored to a second archive file, concurrent with the encoding, to be available after completion of the sequence of program content.

7. The computer-implemented method of claim 1, wherein the archive file further includes at least one of advertising content or secondary content received between the program start trigger and the program end trigger.

8. The computer-implemented method of claim 1, further comprising:
using data from at least one program trigger for the program to generate a filename for the archive file.

9. A system, comprising:
at least one processor; and
memory storing instructions that, when executed by the at least one processor, cause the system to:
receive an input stream of content;
encode an output stream from the input stream;
detect a first trigger in the input stream;
store content from the input stream, concurrent with the encoding, based at least in part on a policy associated with the first trigger, to an archive file;
detect a second trigger in the input stream; and
terminate storage, based at least in part on a policy associated with the second trigger.

10. The system of claim 9, wherein the instructions when executed further cause the system to:
   determine a type of archive file, based at least in part on the policy associated with the first trigger.

11. The system of claim 9, wherein the instructions when executed further cause the system to:
   determine, per at least one policy, that the archive file is to include only program content;
   detect, during storage of the content, a first content trigger indicating content other than the program content;
   pause storage of the content to the archive file;
   detect a second content trigger indicating resumption of the program content in the input stream; and
   resume the storage of the content to the archive file.

12. The system of claim 9, wherein the instructions when executed further cause the system to:
   enable the archive file to be available for presentation via one or more client devices.

13. The system of claim 9, wherein the instructions when executed further cause the system to:
   determine a schedule of a sequence of program content to be received over a period of time; and
   cause the sequence of program content received over the period of time to be stored to a second archive file, concurrent with the encoding, to be available after completion of the sequence of program content.

14. The system of claim 9, wherein the archive file further includes at least one of advertising content or secondary content received between the program start trigger and the program end trigger.

15. The system of claim 9, wherein the instructions when executed further cause the system to:
   use data from at least one program trigger for the program to generate a filename for the archive file.

16. A non-transitory computer readable storage medium storing one or more sequences of instructions executable by one or more processors to perform a set of operations comprising:
   receiving an input stream of content;
   encoding an output stream from the input stream;
   detecting a first trigger in the input stream;
   storing content from the input stream, concurrent with the encoding, based at least in part on a policy associated with the first trigger, to an archive file;
   detecting a second trigger in the input stream; and
   terminating storage, based at least in part on a policy associated with the second trigger.

17. The non-transitory computer readable storage medium of claim 16, further comprising instructions executed by the one or more processors to perform the operations of:
   determining an anticipated sequence of triggers for the content;
   detecting a discrepancy between a received sequence of triggers and the anticipated sequence of triggers; and
   generating a notification indicating the discrepancy while continuing encoding of the content.

18. The non-transitory computer readable storage medium of claim 16, further comprising instructions executed by the one or more processors to perform the operations of:
   causing the archive file to be available for a period of time after broadcasting depending at least in part upon a type of the archive file.

19. The non-transitory computer readable storage medium of claim 16, further comprising instructions executed by the one or more processors to perform the operations of:
   using data from at least one program trigger for the program to generate a filename for the archive file.

20. The non-transitory computer readable storage medium of claim 16, further comprising instructions executed by the one or more processors to perform the operations of:
   determining, per at least one policy, that the archive file is to include only program content;
   detecting, during storage of the content, a first content trigger indicating content other than the program content;
   pausing storage of the content to the archive file;
   detecting a second content trigger indicating resumption of the program content in the input stream; and
   resuming the storage of the content to the archive file.

* * * * *